US007162251B2

(12) United States Patent
Alger

(10) Patent No.: US 7,162,251 B2
(45) Date of Patent: Jan. 9, 2007

(54) METHOD FOR DETECTING TRAFFIC DATA

(75) Inventor: Michael Alger, Munich (DE)

(73) Assignee: Vodafone Holding GmbH, Duesseldorf (DE)

( * ) Notice: Subject to any disclaimer, the term of this patent is extended or adjusted under 35 U.S.C. 154(b) by 417 days.

(21) Appl. No.: 10/311,567

(22) PCT Filed: Jun. 13, 2001

(86) PCT No.: PCT/DE01/02217

§ 371 (c)(1),
(2), (4) Date: Dec. 16, 2002

(87) PCT Pub. No.: WO01/97195

PCT Pub. Date: Dec. 20, 2001

(65) Prior Publication Data

US 2003/0153331 A1 Aug. 14, 2003

(30) Foreign Application Priority Data

Jun. 14, 2000 (DE) ................................ 100 29 115

(51) Int. Cl.
*H04Q 7/20* (2006.01)

(52) U.S. Cl. ............................... 455/456.1; 455/414.1; 455/404.2

(58) Field of Classification Search ............. 455/414.2, 455/456.1, 456.3, 456, 414.1, 422.1, 404.2, 455/446, 67.11; 701/117–119; 340/992, 340/988–989; 379/32; 342/457
See application file for complete search history.

(56) References Cited

U.S. PATENT DOCUMENTS 6,178,374 B1 * 1/2001 Mohlenkamp et al. ...... 701/117
6,230,011 B1 * 5/2001 Guenther et al. ........ 455/432.1
6,426,709 B1 * 7/2002 Becker et al. .............. 340/992
6,442,394 B1 * 8/2002 Valentine et al. ........ 455/456.3
6,466,862 B1 * 10/2002 DeKock et al. ............. 701/117

FOREIGN PATENT DOCUMENTS

| | | |
|---|---|---|
| DE | 196 38 798 A1 | 3/1998 |
| DE | 198 36 089 A1 | 2/2000 |
| DE | 198 36 778 A1 | 2/2000 |
| EP | 0 715 285 A1 | 6/1996 |

* cited by examiner

*Primary Examiner*—Duc Nguyen
*Assistant Examiner*—Wayne Cai
(74) *Attorney, Agent, or Firm*—Cohen, Pontani, Lieberman & Pavane

(57) ABSTRACT

The invention relates to a method for acquiring traffic situation data in a network of traffic routes which is covered by a cellular mobile radio network comprising a multiplicity of base stations and in which a multiplicity of vehicles is moving which are in each case provided with an operating mobile terminal for the mobile radio network. In this method, characteristic patterns of values (called signal transit times in the text which follows), which are representative of the signal transit times with respect to the respective base station during the movement of a terminal along the course of the respective traffic route, are determined and permanently stored at least for some of the individual traffic routes of the network of traffic routes at least for selected base stations, the respective characteristic pattern or a sequence of values representative of this pattern is mapped onto the course of the respective traffic route (calibration). To obtain current traffic situation information, the signal transit times of selected terminals which are located within the transmission area of the respective base station are detected and compared with the stored patterns.

30 Claims, 1 Drawing Sheet

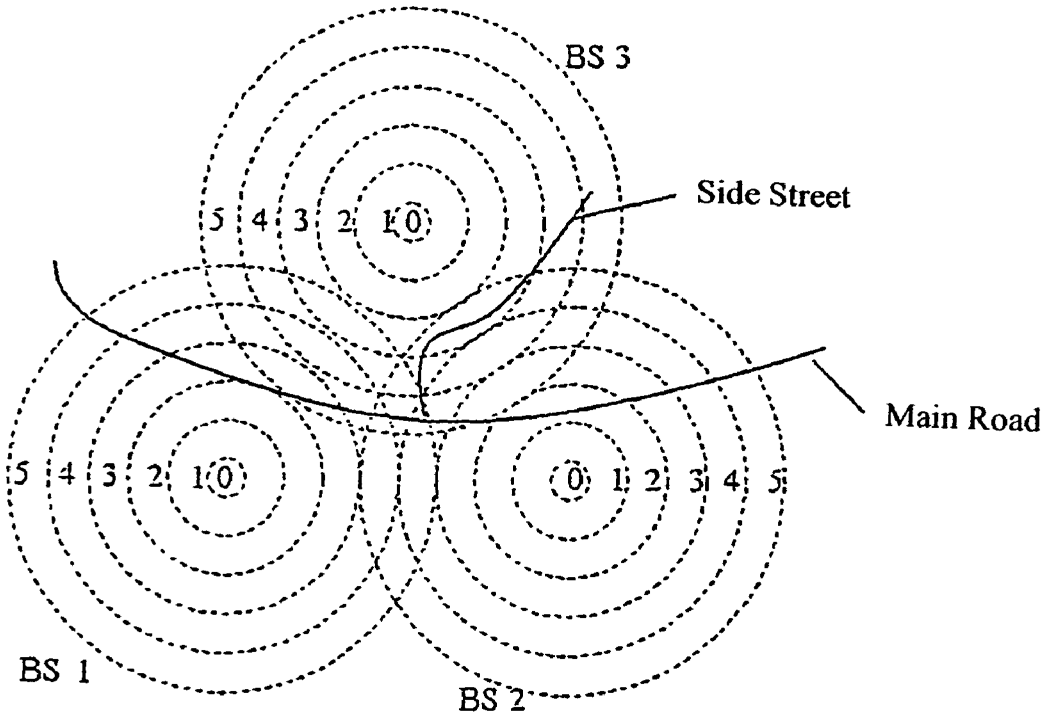
BS 3
Side Street
5 4 3 2 1 0
Main Road
5 4 3 2 1 0
0 1 2 3 4 5
BS 1
BS 2

METHOD FOR DETECTING TRAFFIC DATA

PRIORITY CLAIM

This is a U.S. national stage of application Ser. No. PCT/DE01/02217, filed on Jun. 13, 2001. Priority is claimed on that application and on the following application(s): Country: Germany, Application No.: 100 29 115.5, Filed: Jun. 14, 2000.

BACKGROUND OF THE INVENTION

1. Field of the Invention

The invention relates to a method for acquiring traffic situation data in a network of traffic routes which is covered by a cellular mobile radio network comprising a multiplicity of base stations and in which a multiplicity of vehicles is moving which are in each case provided with an operating mobile terminal for the mobile radio network, particularly a mobile telephone, in which method information about signal transit times between the terminals at the base stations is acquired and used for estimating the current location of individual terminals.

2. Description of the Prior Art

Numerous methods for acquiring traffic situation data are known in which these data are picked up by vehicles, which participate in the road traffic as a fleet of sample vehicles, and are reported to a central station by means of mobile radio, specifying the current vehicle position. The data transmitted to the central station usually contain information on the position of the vehicle and its speed. The current vehicle position is determined in the vehicle itself by using, for example, a satellite navigation system (e.g. GPS). Since a reliable detection of the traffic situation requires a large number of vehicles of the fleet of sample vehicles, the data traffic between the vehicles and the central station results in considerable expenditure. To limit this expenditure, it is known, for example from EP 0 715 285 B1, to provide the vehicles of the fleet of sample vehicles, from the central station, with advance information about the conditions under which a data transmission from the vehicles to the central station is to be undertaken so that the data traffic can be largely restricted to the cases of disturbances of the traffic flow.

Nevertheless, this method entails not only considerable loading on the channels of the mobile radio network used but, moreover, also requires special equipment in the individual vehicles of the fleet of sample vehicles.

From DE 198 36 778 A1 , a method is known for locating mobile telephones in a mobile radio network by triangulation on the basis of signal transit times between the mobile telephone and a number of base stations within the transmitting area of which the mobile telephone is located. In so-called TDMA mobile radio systems, the transit time of each radio link between the mobile terminal and the base stations of the mobile radio network is determined for the purpose of aligning the terminal synchronization, that is to say the phase of the TDMA frame at the terminal. Since the transit time of the signal is representative of the distance between the terminal and the respective base station, the location can be determined very simply, in principle, if the distances to a number of base stations are known. There is thus a possibility of determining the current geographical position of the respective terminal relative to the known geographic positions of the base stations. In principle, the locating can therefore also be done without using a GPS system but, in general, the accuracy is lower because of the limited resolution (approx. 500 m). In centers of population, in particular, it would not be possible to unambiguously correlate a mobile terminal, which is in a vehicle on a road, with this road because of this limited accuracy.

In DE 198 36 089 A1, a method for determining dynamic traffic information is described in which the base stations of a mobile radio network which are set up in a network of traffic routes estimate the respective distance to a mobile terminal by means of the received signal strength and infer movements of the mobile terminal via the change in signal strength. The resolution of this method is comparatively coarse and therefore less suitable, particularly for traffic networks with a high density of traffic routes. However, it is also advantageous in this method that no special terminals need to be available in the individual vehicles but the presence of, for example, an operating mobile telephone in the vehicle is sufficient.

A further method for acquiring traffic situation data by means of mobile radio networks is known from DE 196 38 798 A1. In this document, a method is described in which operating parameters in the mobile radio network, e.g. the number of handovers at the boundary between two cells on a road, are selectively evaluated. The evaluated operating parameters relate to operating sequences and states in the mobile radio network and are correlated with certain traffic conditions in the network of traffic routes. In an initialization phase, data are collected over a relatively long time and processed to form "profiles". In the phase of utilization, the operating parameters of the mobile radio network which are currently detected are compared with these profiles and any deviations found which do not indicate normal traffic conditions are reported to a traffic control center. The disadvantageous factor in this method is that the resolution during the evaluation of handovers at cell boundaries cannot be reliably reproduced. In addition, the cell boundaries are naturally arranged to be stationary and thus do not provide an approach to a method which would be comparable with an acquisition of traffic situation data by means of a fleet of sample vehicles. The cell boundaries cannot everywhere be unambiguously mapped onto certain road segments so that this known method appears to be meaningfully useable only within local limits and outside of population centers.

SUMMARY OF THE INVENTION

It is the object of the present invention to develop a method of the type initially mentioned in such a manner that, in spite of the limited resolution in the determination of the position of a mobile terminal in a mobile radio network, a very reliable detection of the traffic situation on certain traffic routes of a network of traffic routes can be guaranteed without requiring the use of special devices which are directed to the acquisition of traffic situation data in the vehicles using the traffic routes. Furthermore, a system of devices for carrying out this method is to be proposed.

The object is met by a method for acquiring traffic situation data in a network of traffic routes covered by a cellular mobile radio network having a plurality of base stations, a plurality of vehicles in the network of traffic routes each having an operating mobile terminal for communicating with the mobile radio network, signal transit time information related to signal transit times between the mobile terminals and the base stations being acquired and used for estimating a location of the each of the mobile terminals. The method includes determining patterns of signal transit times representative of signal transit times between a mobile terminal and the base stations of the mobile network at a plurality of points on the traffic routes in the network of traffic routes during movement of the mobile terminal along courses of the traffic routes. The determined patterns of signal transit times for at least a portion of individual traffic routes of the network of traffic routes are stored for selected base stations. The determined patterns are then mapped onto a corresponding course of the at least a portion of the individual traffic routes. After this calibration, current traffic situation information may be obtained for assessing the traffic situation by detecting signal transit times of selected ones of the mobile terminals located within a transmission area of a respective base station, comparing the detected signal transit times with the stored patterns, and deciding on which traffic route of the mobile cellular network the selected ones of the mobile terminals are currently located.

In the method according to the invention, a calibration phase can be distinguished from a utilization phase and in the calibration phase, the database for carrying out the actual utilization phase in which the continuous acquisition of the traffic situation data takes place is created. It is an essential feature of the invention that characteristic patterns of values, which are representative of the signal transit times with respect to the respective base station during the movement of a terminal along the course of the respective traffic route, are determined and permanently stored in a data base at least for some of the individual traffic routes of the network of traffic routes at least for selected base stations of the cellular mobile radio network superimposed on the network of traffic routes. These values can be stored in the respective base station or also in an arbitrary central station for a number of base stations or jointly all base stations. In the text which follows, these values are called signal transit times for simplicity. It is clear that these are not necessarily genuine time values but can also be values which correspond to such time values. When a terminal is moving along a traffic route, for each arbitrary point, a particular value of the signal transit time between a terminal and a selected base station of the mobile radio network is obtained which, generally, can be reproduced quite well. In principle, a particular signal transit time to a selected base station can thus be allocated to each location on a traffic route. In principle, a characteristic pattern of signal transit times to a base station is in each case obtained for the geometric course of a traffic route. Such characteristic patterns or, as a substitute, also a sequence of values representative of such a pattern, are mapped onto the course of the respective traffic route in the second step of the calibration phase of the method according to the invention. The data base assembled during the calibration phase thus produces characteristic patterns of signal transit times for the individual traffic routes, which patterns are mapped onto the course of the respective traffic routes and are thus unambiguously correlated with these so that they represent "reference routes", as it were.

In the utilization phase of the method in which the current traffic information is to be obtained, the current signal transit times of selected terminals located in the transmission area of the respective base station are compared with the stored patterns. If this results in significant agreements, it is possible to decide with high reliability which traffic route the respective terminal is currently on or on which traffic route it has just been moved. This decision then supplies the basis for the required information for the assessment of the traffic situation. If a terminal is found, the pattern of which at current signal transit times corresponds to none of the stored characteristic patterns, this is a terminal which, for example, is carried by a pedestrian away from a traffic route or is traveling on a route which has hitherto not been subject to the traffic situation surveillance.

It must also be noted with respect to the signal transit times that each base station has an unambiguous identifier so that an unambiguous correlation is given by appending this identifier to the respective value of the transit time.

The characteristic patterns determined in the calibration phase can be obtained, for example, by statistical evaluations of a multiplicity of terminals moving over the traffic routes, which, for example, are located in vehicles. If many vehicles are moving over the same route, the signal transit times must result in sequences of values which show a very high degree of agreement. Since each location on a route is associated with a typical value of the signal transit time to the respective base station, each sequence of values must contain a multiplicity of values which similarly also occur in the sequences of values for terminals which have passed along the same route. If the signal transit times are detected at certain predetermined time intervals, the number of values determined for a particular route are, naturally, dependent on the respective speed at which the terminal is traveling along the route. The sequence of values must, therefore, be compressed to a standard speed, or pulled apart, to establish comparability. Figuratively speaking, this means that a less dense sequence of measuring points is available for a high speed of movement of the terminal and a denser one for a low speed. Seen graphically, the totality of these measuring points (signal transit times) corresponds to the geographic course of the respective traffic route. In practice, deviations of the actual signal transit time from the signal transit time which corresponds to the actual distance of a measuring site on the route from the respective base station do not lead to errors in the method according to the invention since the method does not make use of the direct calculation of distances but carries out the comparison of patterns described above. This is because deviations on the theoretical signal transit times occur, in particular, due to stationary disturbing influences which affect the characteristic pattern in the same manner as the current measurements. This automatically eliminates the effects of corresponding distortions of the individual values.

Instead of carrying out statistical evaluation for forming the characteristic pattern, it is also possible to determine these patterns by continuous acquisition of the signal transit times measured for an individual moving terminal which is suitably moving in a test vehicle along the traffic routes in the respective transmission area of a base station. In each case, it is thus only necessary to travel along the traffic routes of interest in the network of traffic routes with an operating terminal of the mobile radio network and to record the signal transit times. The advantage of this is that an unambiguous correlation with the road traveled in each case can even be performed during the recording of the data of the characteristic pattern. Naturally, if necessary, corresponding signal transit time values for particularly sensitive points or route sections can also be mapped onto the associated geographic positions.

Although the simple specification of a distance from a base station does not yet define an unambiguous location position, a multiplicity of corresponding measurement values of the signal transit time to an individual base station still generates a characteristic pattern which is generally typical of an individual, quite particular route. In special cases, in which there are symmetric routes of different roads with respect to the base station, however, the unambiguousness cannot be guaranteed. However, the accuracy of the method according to the invention is considerably improved if two or more base stations are used for forming the characteristic pattern of the signal transit times. Suitably, directly adjoining base stations are in each case selected for forming the pattern for a particular route. The individual location positions along the course of the route, i.e. the respective locations of the terminal, are in this case allocated pairs of values with a corresponding number of individual values per position in accordance with the number of base stations taken into consideration. These pairs of values thus represent the coordinates of a system of coordinates with a corresponding number of axes.

The direction in which a terminal is moving along a route can be easily detected from the order in which the individual "route points" of the respective associated characteristic pattern are passed. With respect to the assessment of the traffic situation, the fact that the terminals are moving along a particular route provides at least the information that, in principle, the corresponding route can be traveled in the direction of movement detected. If, in addition, the number of terminals moving in a route section is evaluated, information regarding the traffic density can be obtained, particularly if representative historical values are available for comparison in this respect. However, a particularly good information content of the traffic situation data which can be determined according to the invention can be achieved if, in addition to the signal transit times of the terminals selected for observation, information about the time of the signal transit times determined is also acquired and temporarily stored. Since the magnitude of the signal transit times corresponds to a particular location on the respective route, particularly if they were determined for a number of base stations, the time information items and the correlation of the values of the signal transit times with geographic locations (at corresponding distances from one another) can be used for deriving quantities which are representative of the speed of movement of the respective terminal along the associated traffic route. Determining the current speed provides an informative quantity for assessing the traffic situation.

In principle, the measurement values determined according to the invention can be evaluated within a base station. However, in an advantageous development of the invention, a traffic situation center can also be provided which is responsible for a multiplicity of base stations and to which the information obtained is forwarded. This can be done suitably in such a manner that the data volume is already preprocessed and condensed in each case in the base stations and that reporting to the traffic situation center is primarily done only when anomalies are found in the traffic situation of the sector of the network of traffic routes observed in each case.

If the number of terminals which are currently located in a sector of the network of traffic routes is small, a large percentage of the terminals is suitably selected for obtaining information for the assessment of the traffic situation. If, for example, only 10 terminals are active in such a region, all of them are suitably included in the observation. If, in contrast, the number of terminals operated in such a sector is much greater, a restriction to a small percentage may be completely adequate. Thus, a restriction to a proportion of 20%, for example, in the case of 100 terminals in the same region and a restriction to 5% in the case of 1 000 terminals in this region is possible so that the computing effort is not unnecessarily increased. In principle, therefore, it applies that the greater the number of terminals in an observed sector of the network of traffic routes, the smaller the percentage of selected devices is allowed to be.

Should there be a number of operating terminals in a vehicle which is moving in the observed network of traffic routes and these have been selected for the observation, this can be easily detected from the fact that the transit time values determined and also the time-of-day information thus detected is the same for these devices. In principle, this simulates a higher traffic density. In an advantageous development of the invention, it is provided, therefore, that in the case of detecting a number of terminals with the same characteristic pattern of signal transit times completely or almost at the same time, only one of these terminals is taken into consideration for the evaluation.

The method according to the invention can be advantageously used in a GSM mobile radio network.

The spatial resolution in the determination of the position according to the method according to the invention can be improved by the fact that the smallest measuring unit used as a basis in the determination of the signal transit times in the respective mobile radio network is reduced. In the GSM standard, this measuring unit is, for example, 3.69 μs. Since the signal transit time includes the forward and return path, this corresponds to a single distance of about 550 m.

In the method according to the invention, it is less a matter of precisely locating an individual mobile radio terminal but rather of counting and tracking a sufficient number of terminals which are present in a spatially limited region (e.g. a road section) and are moving correspondingly. A great advantage of the present invention lies in the fact that the required communication costs can be kept extraordinarily low. This is because the essential evaluations can be carried out in the respective base stations in which the signal transit times must be determined in any case for operating the mobile radio network. The creation of communication costs can be restricted to the cases in which the evaluation in a base station indicates the presence of an a typical traffic situation which must be forwarded to the central station.

BRIEF DESCRIPTION OF THE DRAWINGS

The only FIGURE shows the transmission area of three base stations according to the present invention.

DETAILED DESCRIPTION OF THE PREFERRED EMBODIMENTS

The FIGURE shows in a section three base stations BS1, BS2, BS3 of a mobile radio network, the transmission area of which includes a main road and a side street, the side street leading into the main road. The increasing signal transit times in the respective transmission area of the base stations BS1, BS2, BS3 are shown in the form of concentric circles. The individual circles are designated by the numbers 1 to 5 in ascending order while the position of the base station itself has the number 0. If the smallest unit for the signal transit time is 3.69 μs for the GSM standard, this means that the region of the first circle comprises the locations at which the signal transit time is less than 3.69 μs. In the region of the next concentric circle 2, the signal transit times are in each case within a range of once to twice 3.69 μs etc. The step from one circle to the next larger one thus corresponds to a single distance of about 550 m. A terminal moving in the area of the three base stations will thus generate a sequence of signal transit times with respect to the three base stations which corresponds to the movement and which is typical of the traffic route used, i.e. is unambiguous. Each measuring point along the road is associated with a set of values of three individual transit times referred to in each case one of the three base stations. If a terminal carried along in a vehicle is located, for example, on the main road at the turn-off to the side street, the set of values (5; 4; 5) would be determined for this measuring point. This means that the terminal is located in circle 5 with respect to base station BS1, in circle 4 with respect to base station BS2 and in circle 5 with respect to base station BS3. If then the vehicle is turning into the side street, the "transit time coordinate" of the base station 1 first briefly remains at the value 5 and then rises progressively. At the same time, the "transit time coordinate" changes briefly from the value 4 and remains for a relatively long time at the value 5 with respect to base station 2 whereas the "transit time coordinate" with respect to base station 3 first changes from 5 to 4 and then remains at the value 3 for a relatively long time. in this way, a characteristic pattern of transit times or values corresponding to the transit times can be correlated with the geographic course of the route.

What is claimed is:

1. A method for acquiring traffic situation data in a network of traffic routes covered by a cellular mobile radio network having a plurality of base stations communicating with operating mobile terminals in a plurality of vehicles moving in the network of traffic routes, said method comprising:

(a) a calibration phase comprising the steps of:

moving at least one of the mobile terminals along the traffic routes;

determining at a plurality of points on the traffic routes during movement of the at least one of the mobile terminals along the traffic routes signal transit times to respective base stations having a transmission area in which the at least one of the mobile terminals is currently located, each signal transit time being representative of an elapsed time required for transmission of a wireless signal between the at least one of the mobile terminals and one of the respective base stations in the mobile network, whereby the respective base stations exhibit reference patterns of signal transit times at the plurality of points along the traffic routes;

storing for the respective base stations the reference patterns of signal transit times for the traffic routes; and mapping the reference patterns of signal transit times for the traffic routes onto the traffic routes;

thereby creating a database including a reference map between the reference patterns of signal transit times and the traffic routes; and (b) a utilization phase comprising the steps of: detecting signal transit times of selected ones of the mobile terminals to respective base stations comparing the detected signal transit times with the stored reference patterns of signal transit times;

determining on which traffic route the selected ones of the mobile terminals are currently located using the results of said step of comparing and the reference map;

thereby obtaining information for assessing the traffic situation.

2. The method of claims 1, wherein said step of determining reference patterns comprises statistically evaluating signal transit times for a plurality of mobile terminals moving along the traffic routes.

3. The method of claim 1, wherein said step of determining reference patterns includes continuously acquiring signal transit times for a single mobile terminal moving in a vehicle in the transmission area of at least one of the base stations.

4. The method of claim 1, wherein said step of determining reference patterns comprises determining sets of signal transit times with respect to a plurality of adjacent base stations, wherein a respective location of the mobile terminal corresponds to a specific set of signal transit times.

5. The method of claim 4, wherein said step of detecting signal transit times for selected ones of the mobile terminals also includes identifying a time of the detection of the signal transit time and storing the time of detection with the detected signal transit time.

6. The method of claim 5, further comprising the step of deriving a speed of movement of a mobile terminal along a traffic route using the detected signal transit times and the corresponding times of detection.

7. The method of claim 1, wherein said step of detecting signal transit times for selected ones of the mobile terminals also includes identifying a time of the detection of the signal transit time and said step of storing includes storing the time of detection with the detected signal transit time.

8. The method of claim 7, further comprising the step of deriving a speed of movement of a mobile terminal along a traffic route using the detected signal transit times and the corresponding times of detection.

9. The method of claim 1, further comprising the step of reporting the current traffic situation information to a traffic situation center which covers at least a sector of the mobile cellular network.

10. The method of claim 9, wherein said step of reporting comprises reporting the current traffic situation information to the traffic situation center only when an anomaly is found in the traffic situation of the at least a sector.

11. The method of claim 1, wherein said step of obtaining current traffic situation information comprises selecting the selected ones of the mobile terminals for which signal transit times are to be detected in response to a total number of the mobile terminal currently located in area of detection, wherein the selected ones comprise a percentage of the total number of mobile terminals which decreases as the total number of mobile terminals correspondingly increases.

12. The method of claim 1, further comprising determining a total number of mobile terminals in an area of one of the traffic routes of the network of traffic routes for facilitating assessment of the traffic situation.

13. The method of claim 1, wherein said step of detecting signal transit times for selected ones of the mobile terminals also includes identifying a time of the detection of the signal transit time, said method further comprising considering only one of a plurality of mobile terminals that exhibit the same pattern at the same time.

14. The method of claim 1, wherein the mobile cellular network is a GSM mobile radio network.

15. The method of claim 1, further comprising the step of reducing the smallest measuring unit in the determination of the signal transit time to improve spatial resolution.

16. A system for acquiring traffic situation data in a network of traffic routes covered by a cellular mobile radio network having a plurality of base stations, a plurality of vehicles moving in the network of traffic routes, and each of the plurality of vehicles having an operating mobile terminal for communicating with the mobile radio network, said system comprising:

means for creating a database including means for determining at a plurality of points on the traffic routes during movement of at least one of the mobile terminals along the traffic routes signal transit times to respective base stations having a transmission area in which the at least one of the mobile terminals is currently located, each signal transit time being representative of an elapsed time required for transmission of a wireless signal between the at least one of the mobile terminals and one of the respective base stations in the mobile network, whereby the respective base stations exhibit reference patterns of signal transit times at the plurality of points along the traffic routes;

means for storing for the respective base stations the reference patterns of signal transit times for the traffic routes; and means for mapping the reference patterns of signal transit times for the traffic routes onto the traffic routes, and for thereby creating the database including a reference map between the reference patterns of signal transit times and the traffic routes; and means for using the database to assess a traffic situation including means for detecting signal transit times of selected ones of the mobile terminals to respective base stations;

means for comparing the detected signal transit times with the stored reference patterns of signal transit times; and means for determining on which traffic route the selected ones of the mobile terminals are currently located using the results of said means for comparing and the reference map, and thereby for obtaining information for assessing the traffic situation.

17. The system of claim 16, wherein said means for determining reference patterns comprises means for statistically evaluating signal transit times for a plurality of mobile terminals moving along the traffic routes.

18. The system of claim 16, wherein said means for determining reference patterns includes means for continuously acquiring signal transit times for a single mobile terminal moving in a vehicle in the transmission area of at least one of the base stations.

19. The system of claim 16, wherein said means for determining reference patterns comprises determining sets of signal transit times with respect to a plurality of adjacent base stations, wherein a respective location of the mobile terminal corresponds to a specific set of signal transit times.

20. The system of claim 19, wherein said means for detecting signal transit times for selected ones of the mobile terminals also includes means for identifying a time of the detection of the signal transit time and said means for storing includes means for storing the time of detection with the signal transit time.

21. The system of claim 20, further comprising means for deriving a speed of movement of a mobile terminal along a traffic route using the detected signal transit times and the corresponding times of detection.

22. The system of claim 16, wherein said means for detecting signal transit times for selected ones of the mobile terminals also includes means for identifying a time of the detection of the signal transit time and said means for storing includes means for storing the time of detection with the signal transit time.

23. The system of claim 22, further comprising means for deriving a speed of movement of a mobile terminal along a traffic route using the detected signal transit times and the corresponding times of detection.

24. The system of claim 16, further comprising means for reporting the current traffic situation information to a traffic situation center which covers at least a sector of the mobile cellular network.

25. The system of claim 24, wherein said means for reporting comprises means for reporting the current traffic situation information to the traffic situation center only when an anomaly is found in the traffic situation of the at least a sector.

26. The system of claim 16, wherein said means for obtaining current traffic situation information comprises selecting the selected ones of the mobile terminals for which signal transit times are to be detected in response to a total number of the mobile terminal currently located in area of detection, wherein the selected ones comprise a percentage of the total number of mobile terminals which decreases as the total number of mobile terminals correspondingly increases.

27. The system of claim 16, further comprising means for determining a total number of mobile terminals in an area of one of the traffic routes of the network of traffic routes for facilitating assessment of the traffic situation.

28. The system of claim 16, wherein said means for detecting signal transit times for selected ones of the mobile terminals also includes identifying a time of the detection of the signal transit time, said system further comprising means for considering only one of a plurality of mobile terminals that exhibit the same pattern at the same time.

29. The system of claim 16, wherein the mobile cellular network is a GSM mobile radio network.

30. The system of claim 16, further comprising the step of reducing the smallest measuring unit in the determination of the signal transit time to improve spatial resolution.

* * * * *